June 13, 1961 E. P. ANDERSON 2,988,496
ANODE
Filed June 2, 1958

INVENTOR.
EDWARD P. ANDERSON
BY
ATTORNEYS

2,988,496
ANODE

Edward P. Anderson, Livingston, N.J., assignor, by mesne assignments, to Engelhard Industries, Inc., Newark, N.J., a corporation of Delaware
Filed June 2, 1958, Ser. No. 739,280
4 Claims. (Cl. 204—196)

This invention relates to anodes for the cathodic protection of metallic objects in contact with an electrolyte and, more particularly, is concerned with an anode for the cathodic protection of ship hulls by impressed currents.

Anodes of this type customarily consist of a thin disc of precious metal mounted in a support of insulating plastic material. However, such precious metal discs are not permanently bondable to the support and therefore have to be molded therein.

It has been found that an anode especially suitable for use in cathodic protection systems is obtained when using a perforated structure of precious metal, such as a wire screen made from platinum or an alloy thereof, which can be readily mounted between a sheet of a plastic insulating material, preferably of synthetic rubber, at one side, and a plurality of retaining members made from the same or a similar material, at the other side, whereby the retaining members are bonded to the sheet across the perforations in the precious metal structure. The latter can be a perforated foil, and good results have been obtained when using an expanded precious metal sheet or a wire screen. The term: plastic insulating material used hereinafter is to be understood to include all, synthetic or natural, dielectric materials that contain as an essential ingredient an organic compound of high molecular weight, and mixtures thereof, such as polyester resins, natural and synthetic rubber, such as, for example, neoprene.

Figure 1:
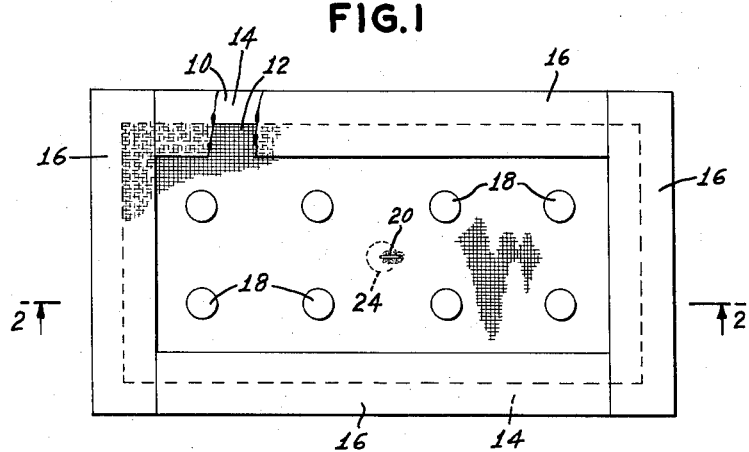
Figure 2:
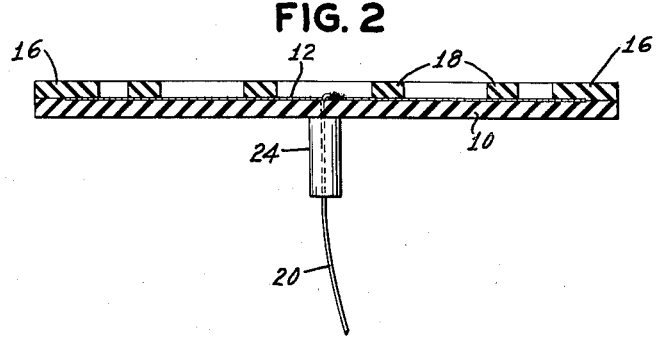

The invention will be further illustrated by reference to the accompanying drawing in which:

FIGURE 1 is a plan view of an anode, and
FIGURE 2 is a sectional view through the anode along the line A—A.

The anode according to the invention consists of a sheet 10 of synthetic rubber, preferably neoprene, and, as the perforated structure, a screen 12 having a smaller area is laid over the sheet 10 such that a circumferential margin 14 is reserved all around the screen 12. In order to retain the screen, in such a way that they overlap the edge of the screen and simultaneously cover the margin 14, the contacting surfaces of the strips 16 made from the same or a similar material as the sheet 10 are coated with any suitable conventional adhesive. By applying pressure to the assembly obtained, a bond between the strips 16 and the sheet 10 is effected which occurs along the margin 14 as well as across the perforations in the screen 12 inasmuch as the strips 16 overlap the screen 12. However, when the material used for the sheet 10, the strips 16 or both is a thermoplastic material, no adhesive is necessary and the bond across the perforations is obtained by the application of heat and pressure instead.

In accordance with the invention, a further means to retain the screen 12 in its position consists of providing a plurality of discs 18 made from the same or a similar material as the sheet 10 which may be distributed over the area of the screen 12 and bonded to the sheet 10 in a manner similar to that described in connection with the strips 16, i.e., by means of a bonding agent or heat and pressure. Preferably, the assembly of the entire structure is effected in one step.

To provide electrical connection with a power supply, a lead-in conductor 20 is affixed, e.g. welded, to the screen 12 as indicated at 22 and conducted outside of the assembly through a cylindrical, insulated seal 24 suitably made from the same material as the sheet 10 and being bonded thereto in any conventional manner. When mounting the anode on the hull of a ship, the cylindrical seal 24 is inserted into a bore provided in the hull and cooperates with a stuffing box affixed to the hull to form a pressure-tight seal.

Whereas the anode illustrated in the drawing has the shape of a rectangle and the strips 16 overlapping the screen 12 form a rectangular frame around the edges thereof, the frame can be fabricated as one integral unit. Furthermore, the anode as a whole may have any desired shape.

It will be obvious to those skilled in the art that many modifications may be made within the scope of the present invention without departing from the spirit thereof, and the invention includes all such modifications.

What is claimed is:

1. An anode comprising a sheet of plastic insulating material and a perforated flat conductive structure of precious metal in surface contact therewith, said structure being mounted between said sheet and a plurality of spaced individual retaining members of a similar insulating plastic material distributed over the area of the precious metal structure at locations away from the edge of the structure and being bonded to the sheet through the perforations in said structure, and means for supplying cathodic protection current to said structure.

2. An anode comprising a sheet of plastic insulating material and a conductive precious metal wire screen in surface contact therewith, the sheet having a surface area larger than that of the precious metal wire screen to form a circumferential margin, said screen being mounted between said sheet and a plurality of retaining members including strips of a similar plastic insulating material overlapping the edges thereof to form a frame around the screen, the strips being bonded to the sheet along at least a portion of the margin and across the perforations in the screen, said retaining members including, additionally, a plurality of spaced individual plastic discs of a similar insulating material distributed over the area of the screen at locations away from the edge of the screen and bonded to the sheet through the perforations in the screen, and means for supplying cathodic protection current to said screen.

3. An anode for the cathodic protection of a metallic surface comprising a sheet of insulating plastic material, a perforated flat conducting sheet made of a material selected from the group consisting of platinum and alloys thereof, said perforated conducting sheet being mounted against one side only of said insulating sheet, a plurality of spaced individual retaining members of a similar insulating plastic material overlying said conducting sheet at locations away from the edge of the conductive sheet and being integrally bonded to said sheet of plastic material through the perforations in said conducting sheet, and electrical conducting means extending through said insulating sheet into contact with said conducting perforated sheet.

4. An anode assembly for the cathodic protection of a surface comprising a sheet plastic insulating support having a first flat side for mounting against the surface to be protected, a perforated sheet conducting electrode structure of precious metal mounted only on the other side of said support, and at least one spaced individual retaining member of a similar plastic insulating material being directly bonded to said support through the perforations in said electrode at a location away from the edge of the electrode, conducting means connected to said electrode and extending through said support for receiving cathodic protection current through the surface to be protected, and means for insulating said conductor from the surface to be protected.

References Cited in the file of this patent

UNITED STATES PATENTS

| | | |
|---|---|---|
| 799,061 | Kellner | Sept. 12, 1905 |
| 1,470,577 | Liebknecht | Oct. 9, 1923 |
| 1,626,774 | Allan | May 3, 1927 |
| 1,788,904 | Zdanski | Jan. 13, 1931 |
| 2,910,419 | Preiser et al. | Oct. 27, 1959 |
| 2,910,420 | Preiser | Oct. 27, 1959 |

FOREIGN PATENTS

| | | |
|---|---|---|
| 123,961 | Great Britain | Mar. 13, 1919 |